(12) United States Patent
Ledlow

(10) Patent No.: US 6,476,716 B1
(45) Date of Patent: Nov. 5, 2002

(54) TEMPERATURE-CONTROLLED VARIABLE RESISTOR

(75) Inventor: Dallas Ledlow, Dallas, TX (US)

(73) Assignee: Dallas Semiconductor Corporation, Dallas, TX (US)

( * ) Notice: Subject to any disclaimer, the term of this patent is extended or adjusted under 35 U.S.C. 154(b) by 0 days.

(21) Appl. No.: 09/713,502

(22) Filed: Nov. 15, 2000

(51) Int. Cl.$^7$ .............................................. G08B 23/00

(52) U.S. Cl. ...................... 340/501; 340/506; 340/3.1; 700/11; 700/295; 700/300

(58) Field of Search ................... 340/501, 3.1, 506, 340/517; 700/4, 9, 19, 11, 12, 295, 300

(56) References Cited

U.S. PATENT DOCUMENTS 6,208,905 B1 * 3/2001 Giddings et al. ............. 700/11

* cited by examiner

Primary Examiner—Daryl Pope
(74) Attorney, Agent, or Firm—Jenkens & Gilchrist

(57) ABSTRACT

A device and method to regulate an electronic device in response to temperature changes is shown and described. For example, the present invention can control devices that are operable in different operational modes. The method and the device can be used so as to include steps of sensing a temperature; accessing a table using the sensed temperature; reading an operational mode indicator from the table, wherein the operational mode indicator corresponds to the sensed temperature; and operating the device in the proper one of the operational modes that corresponds to the operational mode indicator.

26 Claims, 8 Drawing Sheets

TEMPERATURE-CONTROLLED VARIABLE RESISTOR

FIELD OF THE INVENTION

The present invention relates to temperature-responsive electronic devices and methods of operation. More particularly, but not by way of limitation, the present invention relates to temperature-controlled variable resistors, temperature- controlled variable current sources and temperature-controlled variable voltage sources.

BACKGROUND OF THE INVENTION

Many modern electronic devices require very precise current and/or voltage sources for proper operation. Temperature variation, however, can change the operation of a part and thereby change, for example, a required level of operating current/voltage. Present systems compensate for temperature variations in a variety of ways—none of which are completely satisfactory. In particular, these present systems often lack the necessary resolution and cannot be adjusted with enough frequency and/or accuracy.

One electronic device that requires a current source that varies with changes in temperature is a laser diode driver. Laser diodes are notoriously fickle and require a very precise operating current that will generally vary with temperature. For example, the efficiency and optical power of a laser diode above threshold increase with decreasing temperatures. This means that a laser diode that has its operating current configured at room temperature will have reduced output once it warms up past room temperature. Conversely, if the operating current is set up after the laser diode has warmed up, the laser diode may overdrive when it is operated at room temperature. Thus, a laser diode driver would be enhanced by a temperature-controlled regulation device that can adjust current or at least aid in adjusting current. Such a device would allow a laser diode to operate efficiently over a wide range of temperatures to maintain a constant output power.

Of course, laser diode drivers are not the only electronic devices that require temperature-controlled current/voltage sources. For example, transceivers may require a temperature-controlled current source, and those of skill in the art can readily identify numerous other devices that require temperature-controlled current/voltage sources. Thus, a device and method are needed to adjust or aid in adjusting current/voltage sources in response to changes in temperature.

SUMMARY OF THE INVENTION

To remedy the deficiencies of existing systems and methods, the present invention provides, among other things, a method and apparatus to regulate an electronic device in response to temperature changes. For example, one method of the present invention can control a device operable in different operational modes. This method can include the steps of sensing a temperature; accessing a table using the sensed temperature; reading an operational mode indicator from the table, wherein the operational mode indicator can, for example, correspond to the sensed temperature; and operating the device in a proper one of the operational modes, which corresponds to the operational mode indicator.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1A:
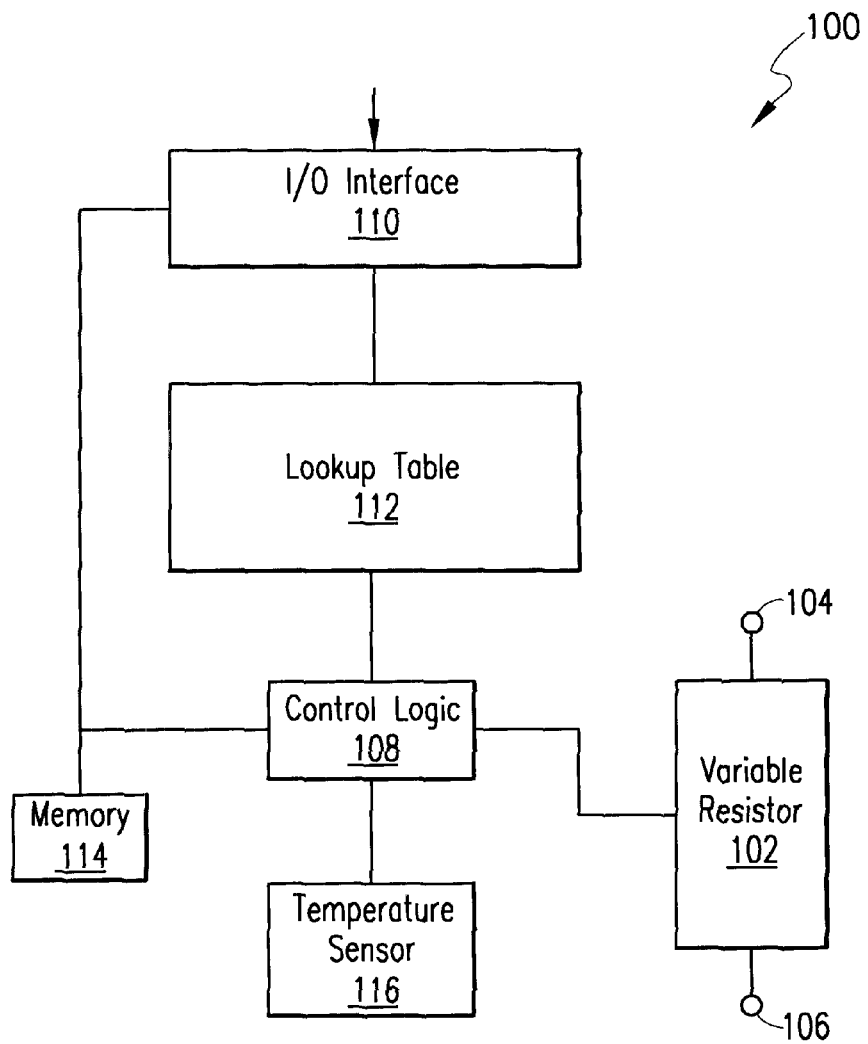
FIG. 1A is a block diagram of a temperature-controlled variable resistor.

Although the present invention is open to various modifications and alternative constructions, a preferred exemplary embodiment that is shown in the drawings is described herein in detail. It is to be understood, however, that there is no intention to limit the invention to the particular forms disclosed. One skilled in the art can recognize that there are numerous modifications, equivalences and alternative constructions that fall within the spirit and scope of the invention as expressed in the claims.

Referring now to FIG. 1A, it is a block diagram of a temperature-controlled variable resistor 100 that can be used for, among other things, adjusting current/voltage sources in response to changes in temperature. This embodiment includes a variable resistor 102 with a high-end resistor terminal 104 and a low-end resistor terminal 106. The variable resistor 102 is responsive to inputs from a control logic 108 that can communicate with the variable resistor 102 in a serial and/or a parallel fashion.

Furthermore, the control logic 108 is connected to an I/O interface 110, a lookup table 112, a memory device 114 and a temperature sensor 116. In operation, the control logic 108 reads a temperature from the temperature sensor 116 and accesses the lookup table 112 to determine a resistance value that corresponds to the temperature read from the temperature sensor 116. This resistance value is then communicated to the variable resistor 102 so that the resistance between the high-end terminal 104 and the low-end terminal 106 can be changed accordingly.

Figure 1B:
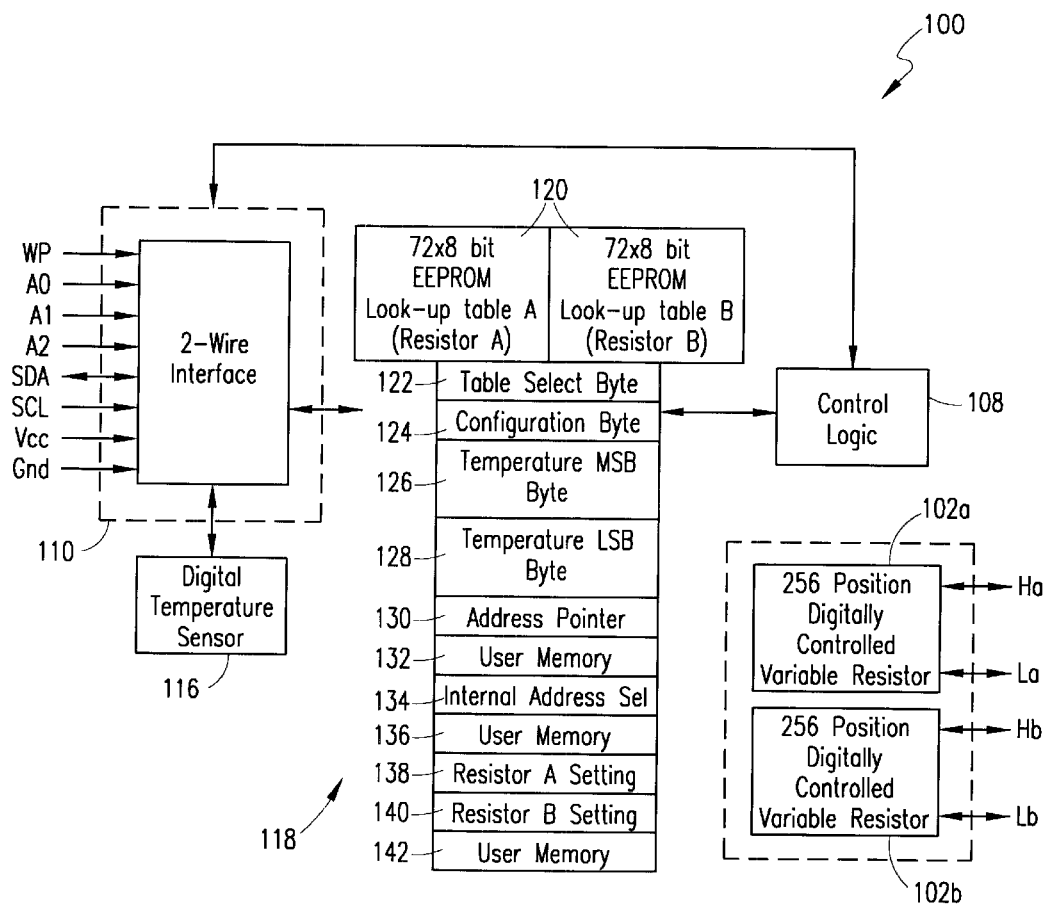
FIG. 1B is a more detailed block diagram of the temperature-controlled variable resistor of FIG. 1A.

Although the device of FIG. 1A can be implemented in a variety of ways, a preferred embodiment is illustrated in FIG. 1B. This embodiment includes an I/O interface 110, a combined memory block 118 (which can include the lookup table 112 and memory device 114 of FIG. 1A), two variable resistors 102*a* and 102*b*, a temperature sensor 116 and a control logic 108.

Referring first to the I/O interface 110, in this embodiment, it is a two wire interface with eight communication pins. These pins include:

$V_{cc}$—Power Supply Terminal.

GND—Ground Terminal.

SDA—2-wire serial data interface. The serial data pin is for serial data transfer. The pin is open drain and may be wire-ORed with other open drain or open collector interfaces.

SCL—2-wire serial clock interface. The serial clock input is used to clock data in on rising edges and clock data out on falling edges.

$H_a$, $H_b$ —High-end terminals (e.g., high-end terminal 104) of the variable resistors 102a, 102b, respectively. For both variable resistors 102a and 102b, it is not required that these high-end terminals be connected to a potential greater than the low-end terminal of the corresponding variable resistor.

$L_a$, $L_b$—Low-end terminals (e.g., low-end terminal 106) of the variable resistors 102a, 102b. For both variable resistors, it is not required that these low-end terminals be connected to the potential less than the high-end terminal of the corresponding variable resistor.

WP—Write Protect. Write Protect should be connected to GND before either the data in memory or resistance level may be changed. Write Protect is pulled high internally and must be either left open or connected to $V_{cc}$ if write protection is desired.

A0, A1, A2—Address Inputs. These input pins specify the address of the device when used in a multi-dropped configuration.

Now referring to the combined lookup table and memory device 118 of FIG. 1B, it can be divided into sections. For example, in one embodiment the memory can be divided as follows:

| Name of Location | Memory Location | Function of Location |
|---|---|---|
| User Defined Lookup Tables 120 | 00h to 47h | This block contains the user defined temperature settings of the variable resistors 102a and 102b. Values between 00h and FFF can be written to either table to set the 256 different resistance levels. The first address location, 00h, is used to set the resistance level for −40° C. Each successive memory location will contain the resistance level for the previous temperature plus 2° C. For example, memory address 01h is the address that stores the resistor setting for a −38° C. environment. |
| Table Select Byte 122 | E0h | Writing to this byte determines which of the two user defined lookup tables 120 is selected for reading or writing. 00h (Table A selected) 01h (Table B selected) |
| Configuration Byte 124 | E1h | The configuration Byte 124 contains three data items: TAU - Temperature/Address Update; TEN - Temperature Update Enable; and AEN - Address Update Enable. The DEFAULT setting is 03h, TAU = 1, TEN = 1 and AEN = 1. TAU becomes a 1 after a temperature and address update has occurred as a result of a temperature conversion. The user can write this bit to 0 and check for a transition from 0 to 1 in order to verify that a conversion has occurred. If TEN = 0, the temperature conversion feature is disabled. The user sets the resistance level for the variable resistor 102 in "manual mode" by writing to addresses F0h and F1h (Resistor A setting and Resistor B setting 140) to control variable resistors A, 102a and B, 102b, respectively. With AEN = 0 the user can operate in a test mode. Address updates made from the temperature sensor will cease. The user can load a memory location into E4h and verify that the values in locations F1h and F2h are the expected user defined values. |
| Temperature MSB 126 | E2h | This byte contains the MSB of the 13-bit 2's complement temperature output from the temperature sensor 116. |
| Temperature LSB 128 | E3h | This byte contains the LSB of the 13-bit 2's complement temperature output from the temperature sensor 116. |
| Address Pointer 130 | E4h | This pointer is the calculated, present resistance level address (0h - 47h). The user-defined resistor setting at this address in the respective look-up table 120 will be loaded into F1h and F2h (Resistor A setting, Resistor B setting) to set the resistance two level resistors 102a, 102b. |
| User Memory 132 | E5h to E6h | This block is general purpose user memory. |
| Internal Address Select 134 | E7h | This byte allows the user to use the external address pins ($A_0$ $A_1$ $A_2$) or an internal register location to determine the address of the temperature-controlled variable resistor 100. The byte is configured as follows: $A^2$ $A^1$ $A^0$ ENB When ENB = 0 and external A2, A1, A0 are grounded, the temperature-controlled variable resistor 100 will use internal address bits ($A^2$, $A^1$, $A^0$) in this register 134. When ENB = 1, external A2, A1, A0 = any setting of the temperature-controlled variable resistor 100 will use external address pins ($A_0$ $A_1$ $A_2$). The DEFAULT setting is 01h. |

| Name of Location | Memory Location | Function of Location |
|---|---|---|
| | | The temperature-controlled variable resistor 100 uses external pins (A₀ A₁ A₂) to determine its address. |
| User Memory 134 | E8h to Efh | This block is general purpose user memory. |
| Resistor A Setting 138 | F0h | In the user-controlled setting mode, this block contains the variable resistance level for resistor 102a. |
| Resistor B Setting 140 | F1h | In the user-controlled setting mode, this block contains the resistance level for the variable resistor 102b. |
| User Memory 142 | F2h to FFh | General purpose user memory. |

Still referring to FIG. 1B, the temperature sensor is a direct-to-digital temperature sensor that measures temperature through the use of an on-chip temperature measurement technique. Temperature measurements are initiated upon power-up, and the most recent result is stored in address locations E2h and E3h (that is, temperature MSB 126 and temperature LSB 128) of the combined memory block 118. New measurements are taken every 10 milliseconds except during reads or writes to memory.

The embodiment of the present invention illustrated in FIG. 1B is the presently preferred embodiment, and the invention should not be limited thereto. For example, the I/O interface 110 could be a one-wire interface, a two-wire interface, a parallel communication interface, etc. Similarly, the combined memory block 118 could be arranged in virtually any fashion—with additional data items being included or some of the listed items being omitted. For example, the combined memory block 118 could be configured to include any number of lookup tables for driving any number of variable resistors. Further, the temperature sensor 116 is not necessarily limited to a direct-to-digital temperature sensor. Any type of temperature sensor can be used.

Figure 1C:
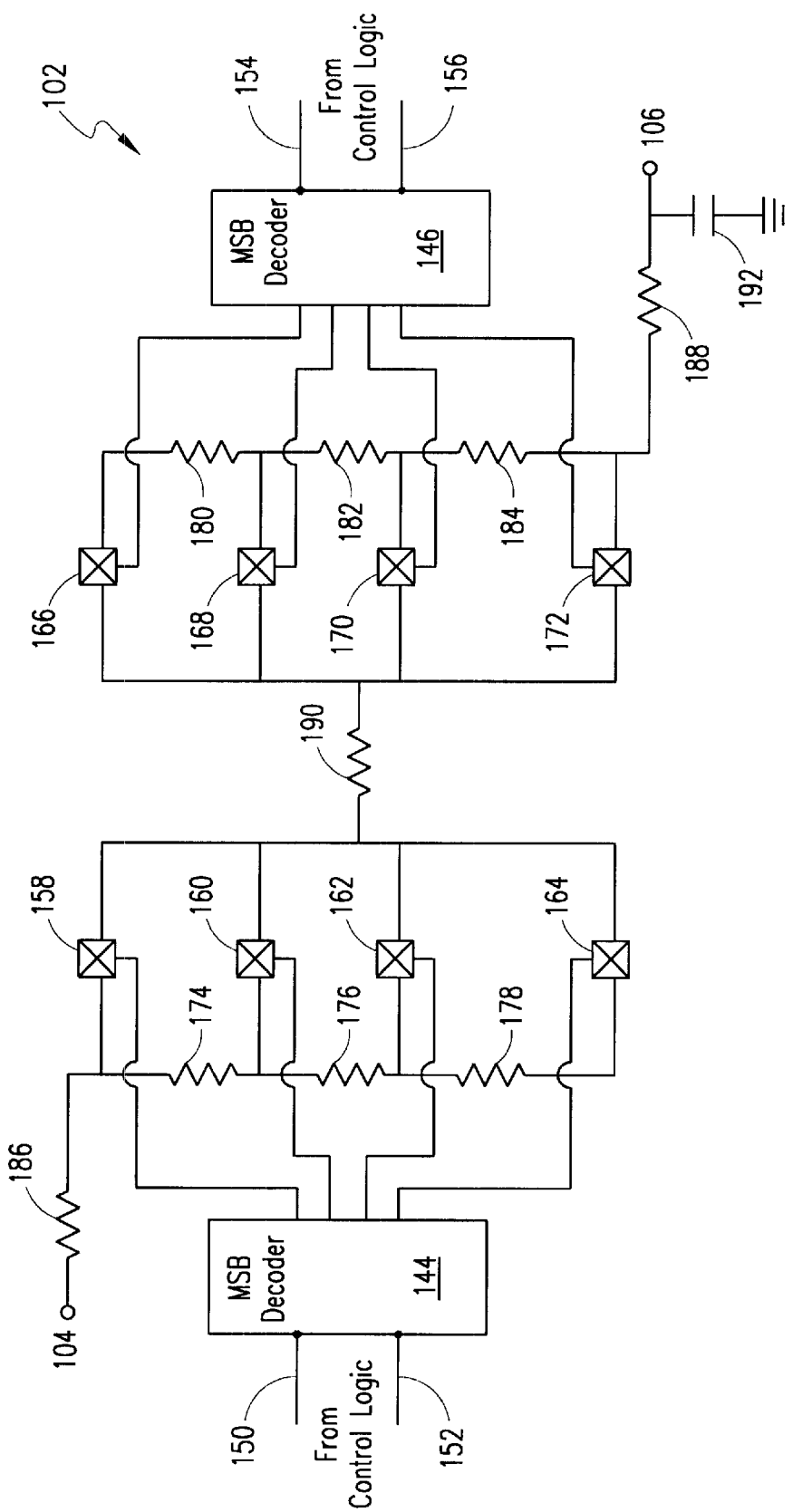
FIG. 1C is a circuit diagram of the variable resistor component shown in FIG. 1A.

Referring now to FIG. 1C, there is illustrated a circuit diagram of the variable resistor 102 shown in FIG. 1A. This embodiment of the variable resistor 102 includes a MSB (most significant bit) decoder 144 and a LSB (least significant bit) decoder 146. Each of these decoders operates a set of associated switches (which can include parallel CMOS devices, FETs, BJTs, etc.) responsive to signals received from the control logic 108. The most significant bits of the signal from the control logic 108 are received at the MSB decoder 144 on lines 150 and 152, and the least significant bits of the signal are received at the LSB decoder 146 on lines 154 and 156.

Still referring to FIG. 1C, the MSB decoder 144 is configured to operate switches 158, 160, 162, and 164, and the LSB decoder 146 is configured to operate switches 166, 168, 170, and 172. By turning certain switches off or on, individual resistors are connected and disconnected from the pathway between terminal 104 and terminal 106 such that the resistance level therebetween is varied.

In this particular embodiment, sixteen different resistance levels (from 0 to 15X) can be achieved. The maximum resistance of 15X is obtained because the resistance value of individual resistors 174, 176, and 178 is four times the value of individual resistors 180, 182, and 184. Thus, the resistance of 15X is obtained by connecting all of the resistors between terminal 104 and terminal 106. The relationship between the resistors is best described in that the value of the individual resistors 174, 176, and 178 should be $2_N$ times the value of the individual resistors 180, 182 and 184, where N equals ½ the number of input bits.

Still referring to FIG. 1C, the operation of the variable resistor 102 can be illustrated by an example. Assume that a signal of binary "1101" is received from the control logic 108 with the left most bit being the most significant bit. The MSB decoder should receive binary "11" and the LSB decoder 106 should receive binary "01". Next, the MSB decoder 144 should turn switch 164 on and switches 158, 160, and 162 off. Similarly, the LSB decoder 146 should turn switch 170 on and switch 166, 168, and 172 off. This configuration of switches causes resistors 174, 176, 178, and 184 to be connected between terminal 104 and terminal 106 and gives a total resistance of 13X.

Further, the variable resistor 102 also includes resistors 186, 188, and 190 as well as a capacitor 192. These components are designed to minimize switching noise within the variable resistor 102. The present invention can also be configured with the switches on the inside of the resistors 174, 176, 178, 180, 182, and 184 relative to terminals 104 and 106. That is, resistors 174, 176, and 178 are located between terminal 104 and the switches 158, 160, 162, and 164 and resistors 180, 182, and 184 are located between terminal 106 and switches 166, 168, 170, and 172.

In this embodiment, only four inputs 150, 152, 154, and 156 are used, thereby giving the part 16 different resistance levels. One skilled in the art, however, can recognize that the number of inputs could be altered or varied to provide virtually any number of different resistance levels. Additionally, one skilled in the art can recognize that the variable resistor 102 could be designed with any number of decoders and banks of resistors. For example, a variable resistor with 16 different resistance levels could be designed with a single, four-input/16 output decoder. Such a variable resistor could include 16 switches and 15 resistors arranged in a single bank. In another embodiment, the variable resistor could include 3 decoders—each with three inputs. This embodiment of the variable resistor would include three banks of eight switches and would provide 512 different resistance levels.

Figure 2A:
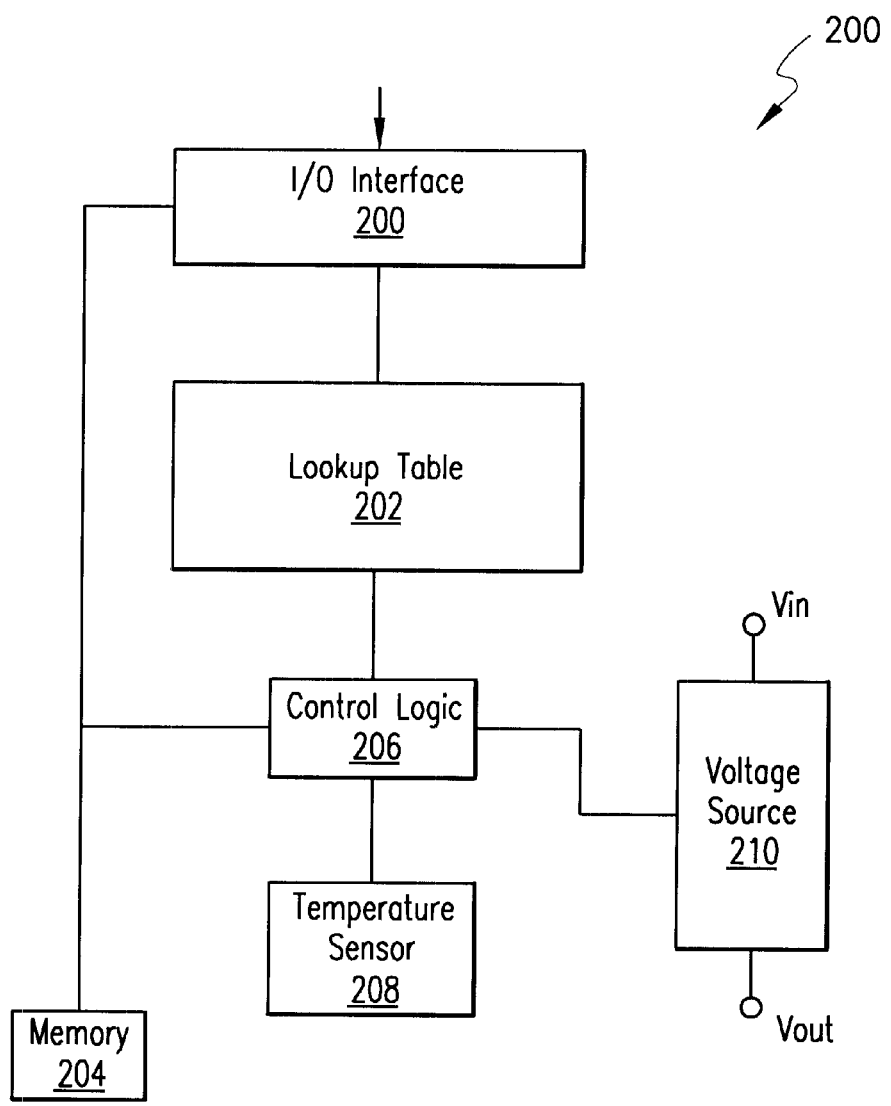
FIG. 2A is a block diagram of a temperature-controlled variable voltage source.

Now referring to FIG. 2A, it is a block diagram of a temperature-controlled variable voltage source 200. This embodiment of the present invention is similar to the temperature-controlled variable resistor 100 shown in FIG. 1A. For example, the temperature-controlled variable voltage source includes an I/O interface 200, a lookup table 202, a memory 204, a control logic 206 and a temperature sensor 208. The temperature-controlled variable voltage source 200, however, includes a variable voltage source 210 rather than the variable resistor 102 (shown in FIG. 1A).

In operation, the temperature sensor 208 senses a temperature and provides that information to the control logic 206, which accesses the lookup table 202 to determine a proper setting for the variable voltage source 210. This setting is then communicated to the variable voltage source 210 so that the output voltage at $V_{out}$ can be adjusted. In one embodiment, the voltage output from the variable voltage source 210 is varied by varying an internal resistance. For example, in one embodiment, the variable voltage source 210 includes a variable resistor such as the variable resistor 100 shown in FIG. 1A. As the resistance value is changed, the voltage drop is changed and the value of $V_{out}$ is changed.

Figure 2B:
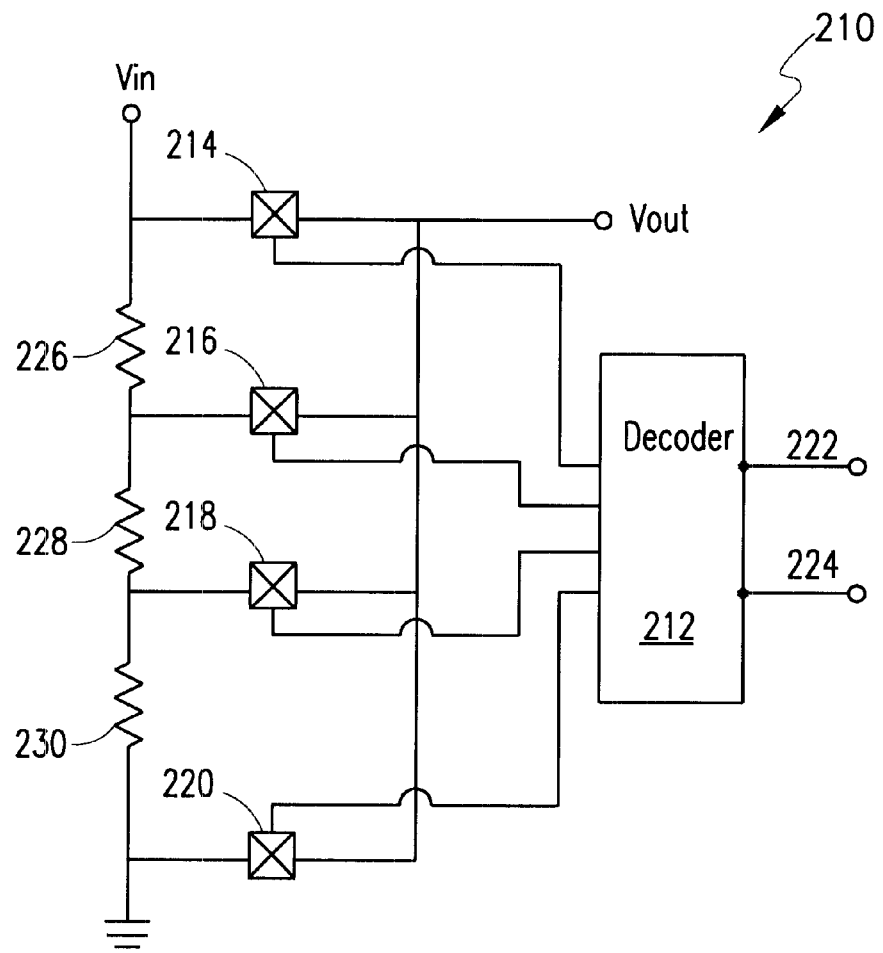
FIG. 2B is a circuit diagram of the variable voltage source shown in FIG. 2A.

Another embodiment of the variable voltage source 210 is illustrated in FIG. 2B. In this embodiment, a 2-input decoder 212 is connected to four switches 214, 216, 218, and 220. Depending upon the value of the input at lines 222 and 224, at least one of the four switches will be turned on, thereby setting the resistance value between $V_{in}$ and $V_{out}$. For example, if the input into the decoder is binary "10", then switch 218 will be turned on (and switches 214, 216, and 220 will be turned off), and the resistance between $V_{in}$ and $V_{out}$ will be the value of resistor 226 plus the value of resistor 228. Resistor 230 will not impact the total resistance. Accordingly, $V_{in}$ will be dropped according to resistors 226 and 228.

Figure 3A:
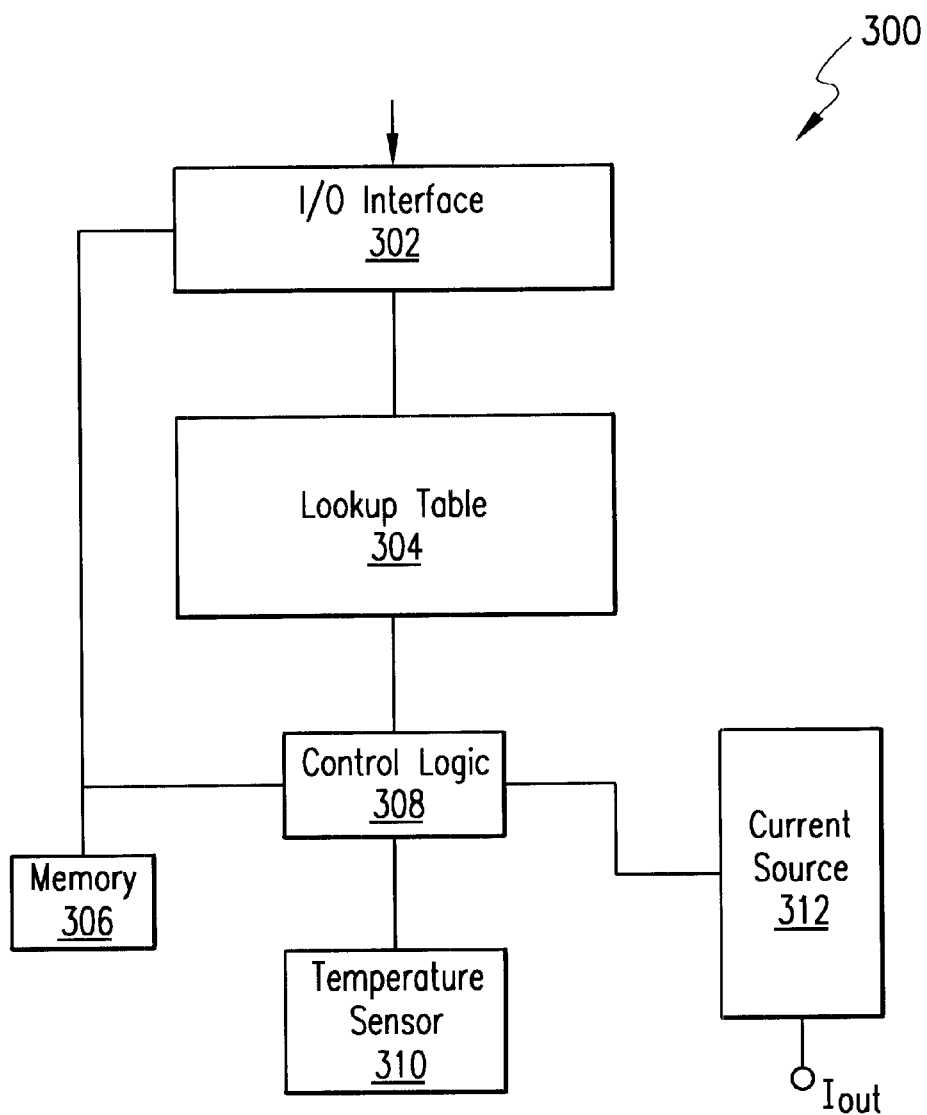
FIG. 3A is a block diagram of a temperature-controlled variable current source.

Now referring to FIG. 3A, it is a block diagram of a temperature-controlled variable current source 300. The temperature-controlled variable current source 300 includes an I/O interface 302, a lookup table 304, a memory 306, a control logic 308, a variable current source 312 and a temperature sensor 310. In operation, the temperature sensor 310 senses a temperature and provides that information to the control logic 308, which accesses the lookup table 304 to determine a proper setting for the variable current source 312. This setting is then communicated to the variable current source 112 where the output current is adjusted accordingly.

Figure 3B:
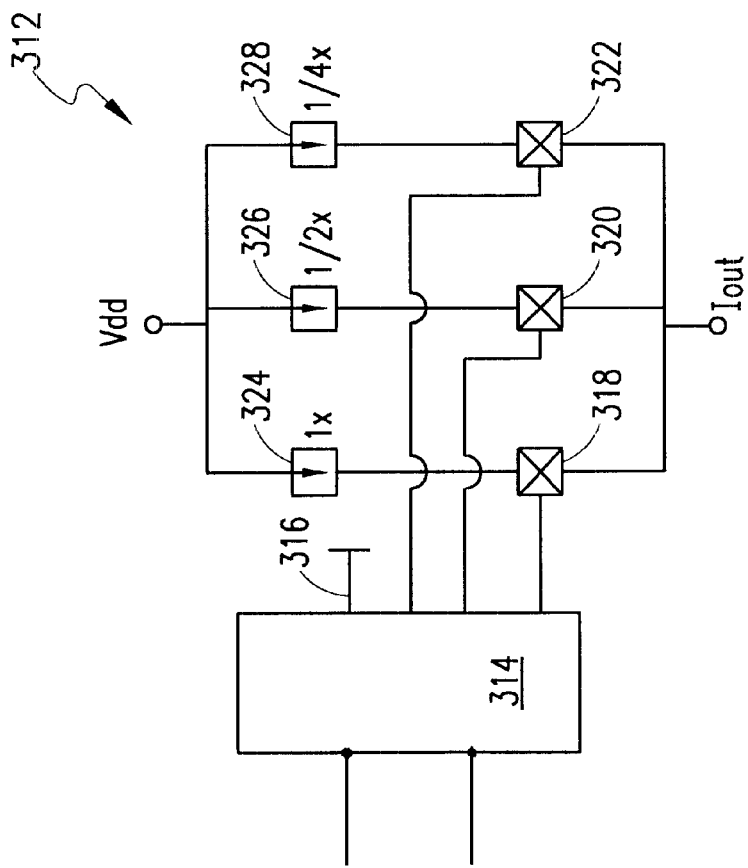
FIG. 3B is a circuit diagram of the variable current source shown in FIG. 3A.

Although the variable current source 312 can be designed in a variety of ways, good results have been achieved with the circuit shown in FIG. 3B. In this embodiment, the variable current source 312 includes a two-input decoder 314 with one output 316 left unconnected and three outputs connected to switches 318, 320, and 322. Each switch is associated with one of current sources 324, 326, and 328. When a switch is on, the associated current source can contribute to the current at $I_{out}$, and when a switch is off, the associated current source cannot contribute to the current at $I_{out}$. Additionally, in this embodiment, any combination of switches 324, 326, and 328 can be on. For example, if a current of 1¾ X is desired at $I_{out}$, switches 324, 326, and 328 should be on simultaneously.

Figure 4A:
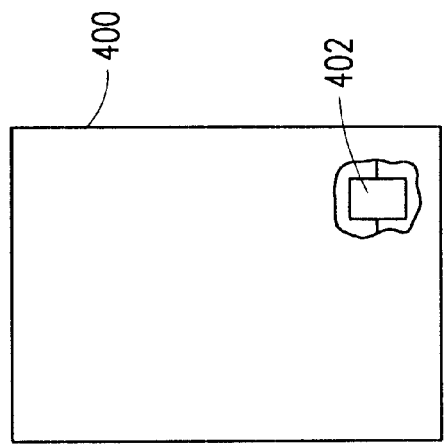
FIG. 4A is an illustration of an electronic device with an integrated temperature-controlled regulation device.

Now referring to FIG. 4A, it is an illustration of an electronic device with an integrated temperature-controlled regulation device 402 such as the temperature controlled resistor 102, the temperature controlled voltage source 210 and/or the temperature controlled current source 312. The electronic device 400 can be any type of electronic device that requires temperature based regulation, including laser diode drivers, wireless devices, power sources, etc.

Figure 4B:
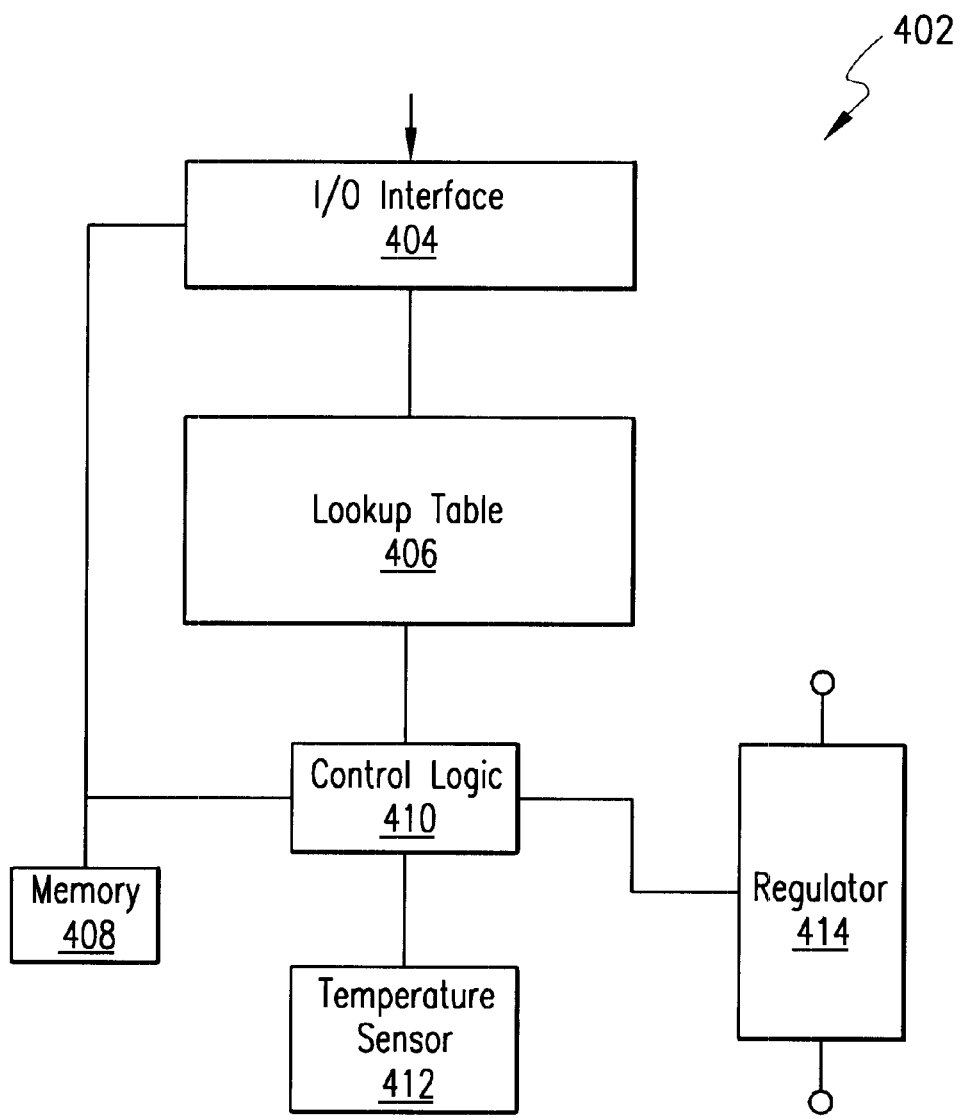
FIG. 4B is a block diagram of a temperature controlled regulation device as shown in FIG. 4A.

The temperature-controlled regulation device 402 is shown in greater detail in FIG. 4B. This embodiment reflects a generic version of the devices shown in FIGS. 1A, 2A, and 3A. For example, the temperature-controlled regulation device 402 includes an I/O interface 404, a lookup table 406, a memory 408, a control logic 410, and a temperature sensor 412. Additionally, the temperature-controlled regulation device 402 includes a regulator 414 that could be a variable resistor, a variable current source, a variable voltage source, or any other type of regulator. Moreover, when the temperature-controlled regulation device 402 includes the variable resistor, the overall device does not necessarily need to be associated with temperature-controlled voltage/current source.

Although the present invention is described with relation to the illustrated embodiments, those skilled in the art can readily recognize that numerous variations, substitutions or deletions may be made from the embodiments shown and described, however the invention use and its configuration would achieve substantially the same or similar results as achieved by the specific exemplary embodiments described herein. Accordingly, there is no intention to limit the invention to the disclosed exemplary form. Many variations, modifications and alternative constructions fall within the scope and spirit of the disclosed invention as expressed in the claims.

What is claimed is:

1. A method for controlling a device operable in a plurality of operational modes, the method comprising:

sensing a temperature at least in part as a lookup indicia within said table;

accessing a table using the sensed temperature;

reading a operational mode from the table, wherein the operational mode corresponds to the sensed temperature; and operating the device in the one of the plurality of operational modes that corresponds to the operational mode indicator the operational mode of the device according to the read regulator operational mode.

2. A method for controlling a device operable in a plurality of operational modes, the method comprising:

sensing a temperature;

accessing a table using the sensed temperature;

reading a operational mode from the table, wherein the operational mode corresponds to the sensed temperature; and operating the device in the one of the plurality of operational modes by adjusting a resistance level of a variable resistor that corresponds to the operational mode indicator the operational mode of the device according to the read regulator operational mode.

3. The method of claim 1, wherein the step of adjusting the operational mode comprises the step of:

adjusting a voltage output of a variable voltage source.

4. The method of claim 1, wherein the step of adjusting the operational mode comprises the step of:

adjusting a current output of a variable current source.

5. The method of claim 1, storing in the table a plurality of operational mode indicators, wherein each of the plurality of operational mode indicators is associated with one of a plurality of temperatures.

6. The method of claim 5, wherein the regulator operational data corresponds to a resistance setting.

7. The method of claim 5, wherein the regulator operational data corresponds to a voltage setting.

8. The method of claim 5, wherein the regulator operational data corresponds to a current setting.

9. A temperature-responsive regulation device comprising:

a temperature sensor configured to sense a temperature;

a storage device configured to store a plurality of settings, wherein each one of the plurality of settings is associated with at least a particular temperature within a range of temperatures;

a regulator configured to be operable in one of a plurality of modes, wherein each one of the plurality of modes corresponds to at least one of the plurality of settings stored in the storage device and wherein the plurality of modes comprises a plurality of resistance levels; and a controller electronically coupled with the temperature sensor, the storage device and the regulator;

wherein the controller is configured to retrieve a first of the plurality of settings from the storage device in response to receiving the temperature sensed by the temperature sensor; and wherein the controller is configured to communicate at least an indication of the retrieved first of the plurality of settings to the regulator to thereby cause the regulator to be operable in a corresponding one of the plurality of modes.

10. The device of claim 9, wherein the plurality of modes comprises a plurality of voltage output levels.

11. The device of claim 9, wherein the plurality of modes comprises a plurality of current output levels.

12. The device of claim 9, wherein the storage device comprises a lookup table.

13. The device of claim 9, wherein at least one of the plurality of settings is user-reprogrammable.

14. The device of claim 9, wherein the regulator comprises:
a variable resistor.

15. The device of claim 9, wherein the regulator comprises:
a variable voltage source.

16. The device of claim 9, wherein the regulator comprises:
a variable current source.

17. The device of claim 9, wherein the device is incorporated into a laser diode driver.

18. The device of claim 9, wherein the device is incorporated into a wireless communication device.

19. The device of claim 9, further comprising:
an I/O interface connected to the controller.

20. A device comprising:
a temperature sensor for sensing a temperature;
a regulator electronically coupled to the temperature sensor, wherein the regulator is configured to be operable in a plurality of operational modes; and
a memory device electronically coupled with the regulator, wherein the memory device is configured to store a Operational mode plurality of indicators;

wherein each of the plurality of operational mode indicators is associated with at least one of the plurality of operational modes; and wherein each one of the plurality of indicators is associated with a particular temperature; and wherein a first of the plurality of indicators is retrievable responsive to the memory device receiving at least an indication of the sensed temperature; and wherein the regulator is configured to receive the first of the plurality of indicators and thereby operate in the one of the plurality of operational modes that is associated with the received first of the plurality of indicators.

21. The device of claim 20, wherein the plurality of operational modes comprises:
a plurality of resistance levels.

22. The device of claim 21, wherein the plurality of operational modes comprises:
a plurality of voltage output levels.

23. The device of claim 20, wherein the plurality of operational modes comprises:
a plurality of current output levels.

24. The device of claim 20, wherein at least one of the plurality of settings is user-loadable.

25. The device of claim 21, wherein the device comprises:
a laser diode driver.

26. The device of claim 20, wherein the device comprises:
a wireless communication device.

* * * * *

UNITED STATES PATENT AND TRADEMARK OFFICE
CERTIFICATE OF CORRECTION

PATENT NO. : 6,476,716 B1
DATED : November 5, 2002
INVENTOR(S) : Dallas Ledlow

It is certified that error appears in the above-identified patent and that said Letters Patent is hereby corrected as shown below:

Column 6,
Line 4, replace "$2_N$" with -- $2^N$ --.

Column 8,
Lines 8-10, replace "sensing a temperature at least in part as a lookup indicia within said table; accessing a table using the sensed temperature;" with -- sensing a temperature; accessing a table using the sensed temperature at least in part as a lookup indicia within said table; --.

Signed and Sealed this

Second Day of May, 2006

JON W. DUDAS
*Director of the United States Patent and Trademark Office*